March 1, 1949.                  G. K. RICHARDSON                  2,463,056
                                 AIRPLANE GUN MOUNT
Filed July 3, 1944                                              7 Sheets-Sheet 1

Fig. 1

Inventor
George K. Richardson
By His Attorney

Fig. 2

March 1, 1949.    G. K. RICHARDSON    2,463,056
AIRPLANE GUN MOUNT
Filed July 3, 1944    7 Sheets-Sheet 4

Inventor
George K. Richardson
By his Attorney

Fig. 6

March 1, 1949. G. K. RICHARDSON 2,463,056
AIRPLANE GUN MOUNT
Filed July 3, 1944 7 Sheets-Sheet 6

*Inventor*
George K. Richardson
By His Attorney

March 1, 1949.
G. K. RICHARDSON
2,463,056
AIRPLANE GUN MOUNT

Filed July 3, 1944
7 Sheets-Sheet 7

Inventor
George K. Richardson
By his Attorney

Patented Mar. 1, 1949

2,463,056

UNITED STATES PATENT OFFICE 2,463,056

AIRPLANE GUN MOUNT

George K. Richardson, Wenham, Mass., assignor to United Shoe Machinery Corporation, Flemington, N. J., a corporation of New Jersey Application July 3, 1944, Serial No. 543,345

1 Claim. (Cl. 89—37.5)

This invention relates to ordnance and is herein illustrated in its application to gun mounts for use in airplanes.

Airplane gun mounts, particularly gun mounts in the tail portion of an airplane, must operate within a very limited space, and for obvious reasons must be as light in weight as practicable. In general, it is an object of the present invention to provide a gun mount for the tail portion of an airplane in which the maximum of fire power is achieved in a gun mount the dimensions of which do not exceed the limits of the small space provided therefor in the tail portion of an airplane and the weight of which does not exceed prescribed limits. It is a further object of the invention to provide a gun mount of this type in which the guns have an extensive field of operation, the illustrated mount being so constructed that the guns have a range of movement both in azimuth and in elevation extending 60° in each direction from a central position.

With the above objects in view the invention in one aspect thereof comprises a gun mount having a column constructed and arranged for turning movement in azimuth and a cradle pivotally mounted on the column for movement in elevation, said mount being characterized by an arrangement of four guns on the cradle such that two guns are mounted above the axis of the cradle on the column and spaced equally distant from the axis of the column while the other two guns are positioned below the axis of the cradle on the column and also are spaced equally distant from the axis of the column. Preferably all four guns are equally spaced from the axis of the cradle on the column, thus providing an assembly in which the forces imparted to the cradle by simultaneous firing of the four guns balance each other and impart no turning movement to the cradle or to the column.

In order that the cradle may be small and as light as practicable the two yokes which support the upper guns are arranged to extend upwardly from the cradle and the two yokes which mount the lower guns are arranged to extend outwardly from the lower portion of the cradle, the arrangement being such that the recoil cartridge of each of the upper guns is mounted in its yoke to swing on an axis extending widthwise of the gun while the recoil cartridge of each of the lower guns is mounted in its yoke to swing on an axis extending heightwise of the gun, such swinging movement being for purposes of bore sighting.

These and other features of the invention will now be described with reference to the accompanying drawings and pointed out in the appended claim.

Figure 1:
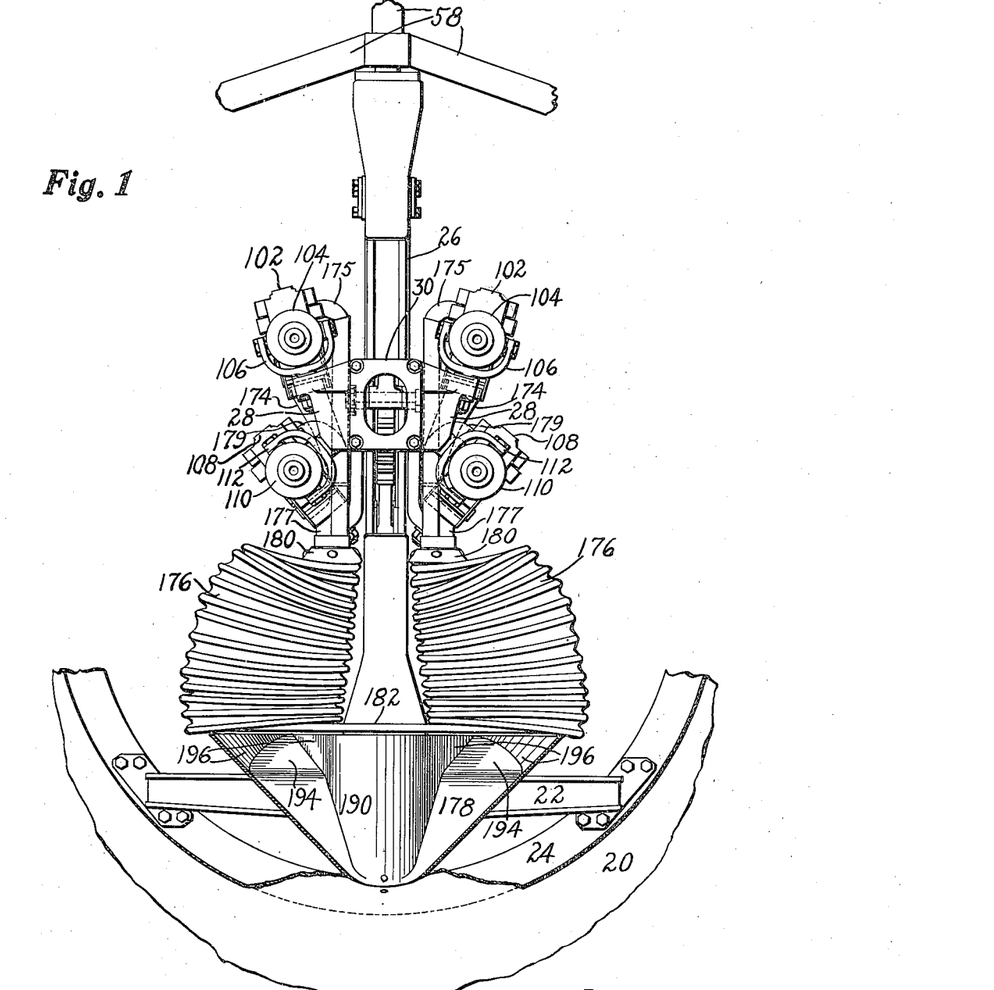
Fig. 1 is a view in elevation of a gun mount embodying the features of the present invention, said view being taken from a point outside the plane looking in the general direction of the bores of the guns.
Figure 2:
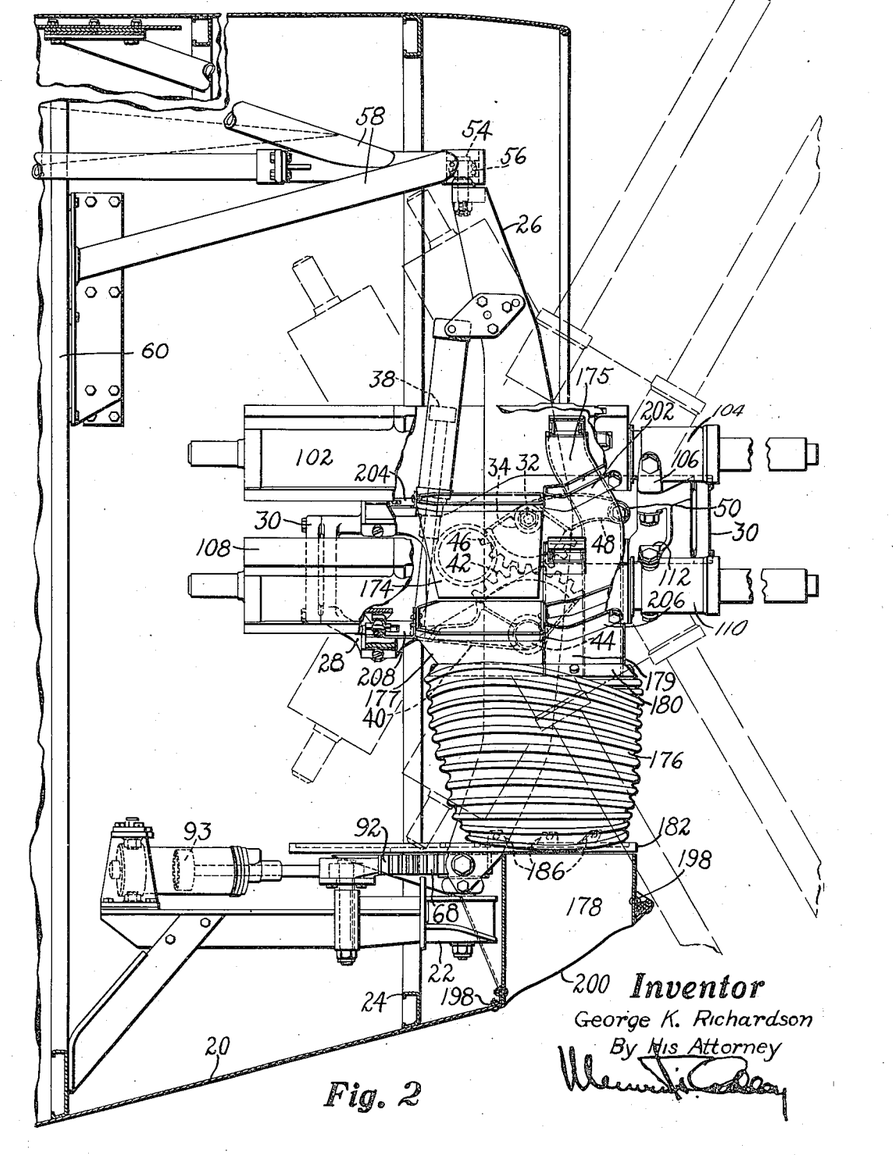
Fig. 2 is a side elevation of the gun mount illustrated in Fig. 1 with the fuselage shown in section and the guns partly broken away, the extreme limits of movement of the guns in elevation being diagrammatically shown.
Figures 4, 5:
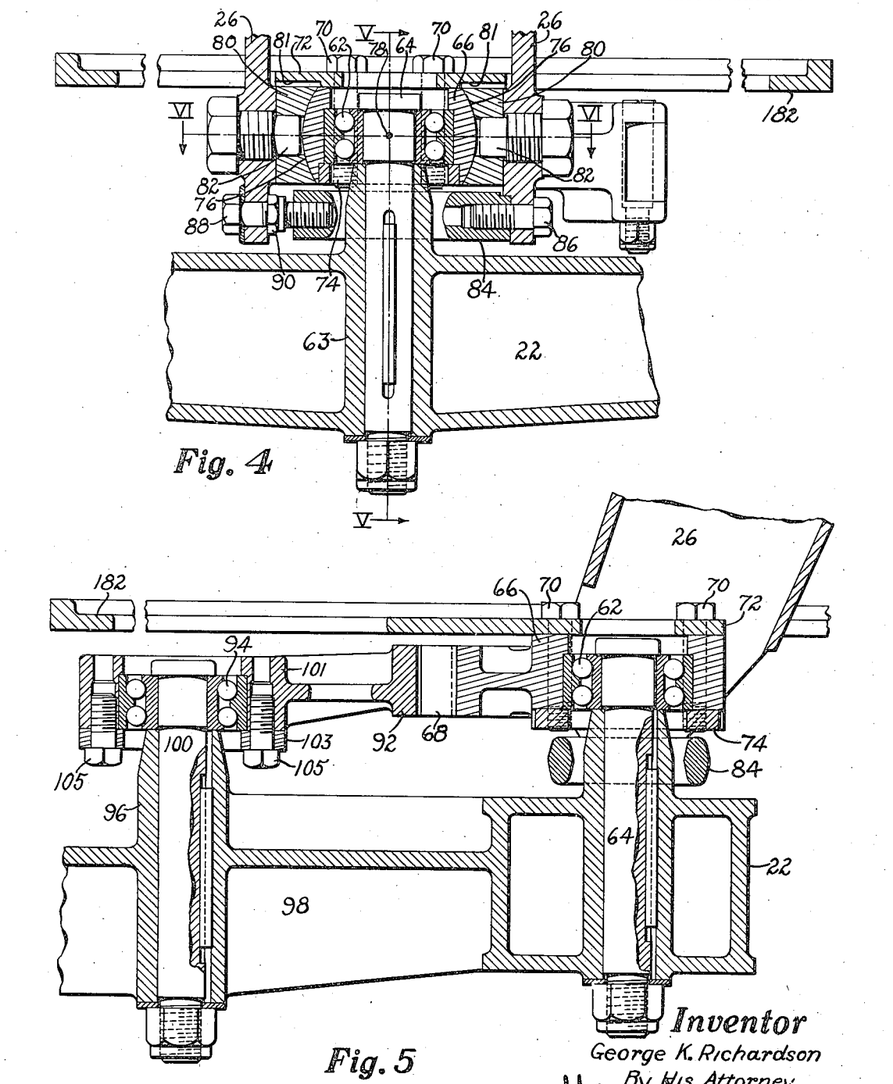
Fig. 4 is a sectional elevation of the lower bearing of the column and the so-called actuating assembly taken on a plane common to the axis of the bearing and looking in the same direction as in Fig. 1.
Fig. 5 is a sectional view taken on the line V—V of Fig. 4.
Figure 6:
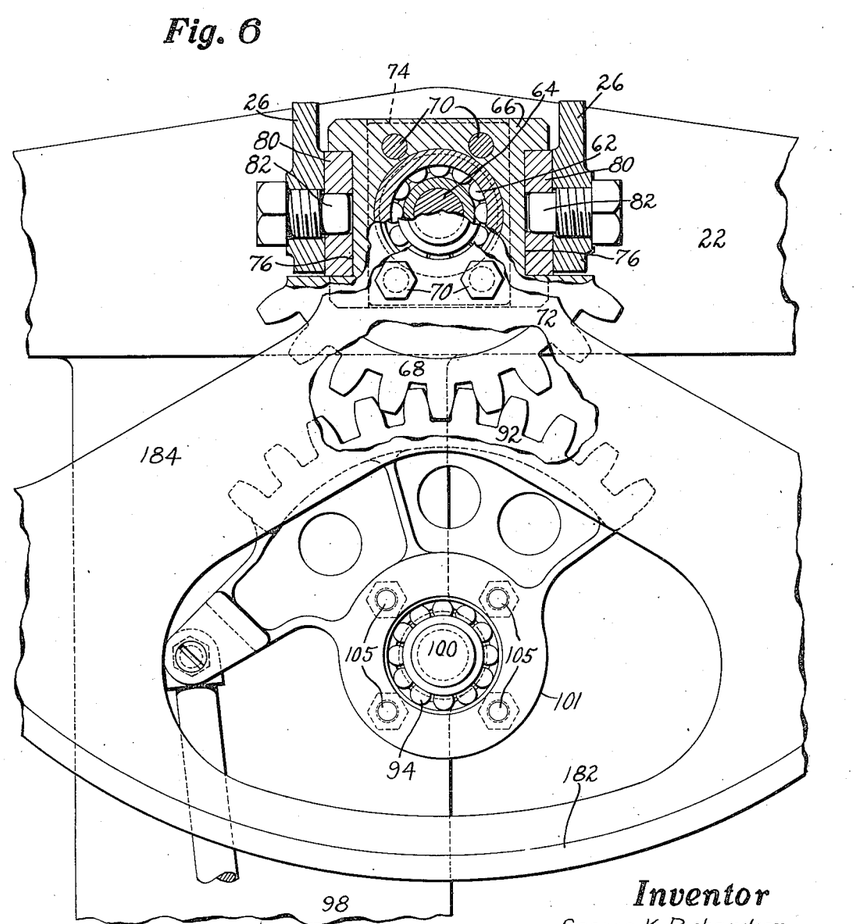
Fig. 6 is a plan view partly in section on the line VI—VI of Fig. 4.
Figure 7:
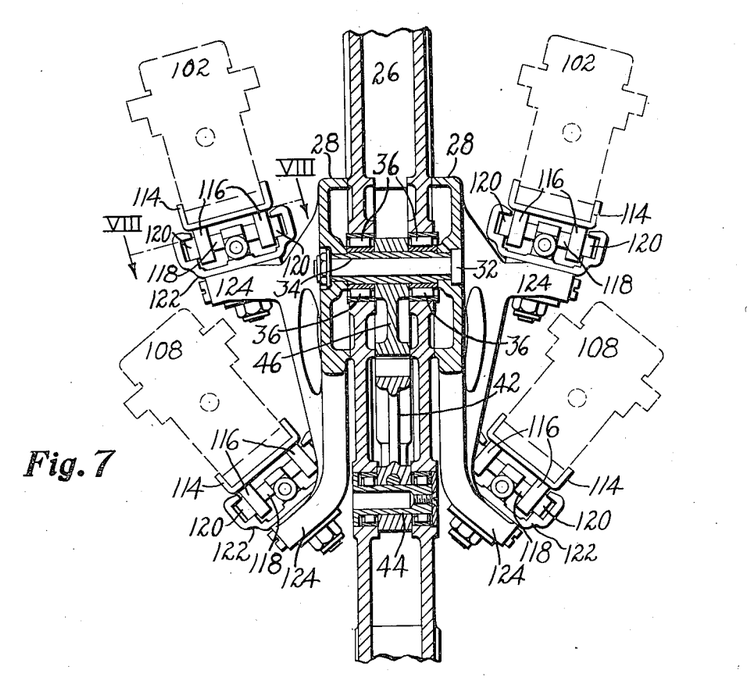
Fig. 7 is an elevation taken from the same position as Fig. 1, illustrating the mounting of the breech portions of the guns, said guns being diagrammatically shown and the column and the cradle being shown in section in a plane common to the axis of the cradle on the column.

Referring to Fig. 1, the illustrated gun mount is located in the tail portion of an airplane, a portion of the fuselage of which is indicated by the numeral 20. The gun mount is supported on a crosshead 22 secured to a rib 24 of the fuselage. The crosshead 22 supports a column 26 for movement on an axis extending heightwise of the airplane. Mounted on the column for swinging movement on an axis extending widthwise of the airplane is a hollow cradle surrounding the column, the illustrated cradle comprising two adapters 28 the opposite ends of which are secured together by heads or end plates 30. Mounted on the adapters are four .50 caliber machine guns, the bores of said guns defining four corners of a rectangle the sides of which are respectively parallel and perpendicular to the axis of the column. Referring to Figs. 2 and 7 the adapters 28 are secured by a clamping bolt 32 to a hollow shaft 34 which turns in roller bearings 36 mounted in the column 26. For swinging the cradle together with the gun assembly to move the guns in elevation a hydraulically actuated piston 38 (Fig. 2) is connected to an arm 40 extending from a gear segment 42 mounted on a shaft 44 extending through the column 26, and arranged to mesh with a similar segment 46 mounted on the hollow shaft 34, said segment having an extension 48 the end of which has a crosshead 50 secured to the adapters 28. Referring to Fig. 2, the column 26 is a generally bow-shaped member of channel iron construction having at its upper end a pivot pin 54 mounted in a self-alining bearing 56 contained in a supporting tubular structure 58 secured to a rib 60 of the fuselage. The mounting for the lower portion of the column is illustrated in Figs. 4, 5 and 6. Referring to Fig. 4, a ball bearing 62 is supported on a hollow cylindrical structure 63 formed in the crosshead 22 and is secured thereto by a clamping bolt 64 the head of which engages the inner race of the bearing 62. The illustrated ball bearing is constructed to resist both radial and axial thrusts. The outer race of the ball bearing is mounted in a counterbore in the hub 66 of a gear segment 68 (Fig. 6) and is secured in said counterbore by four clamping screws 70 which extend through a plate 72 overlying the hub 66 and through the hub itself and are threaded into a rectangular plate 74 mounted in a recess in the bottom of the hub 66. The opposite side faces 76 of the hub 66 are of cylindrical shape having a common center at the point 78 (Fig. 4). Two shoes 80 having inner cylindrical surfaces complemental to the cylindrical side faces of the hub 66 are mounted on said side faces to turn freely thereon. The bottom of the plate 72 has marginal recesses 81 formed therein to provide clearance for a limited movement of the shoes on the hub. The shoes are bored to provide bearings for trunnion pins 82 extending inwardly from the lower portions of the side walls of the column 26. For holding the side walls of the column against spreading, a ring 84 is positioned between the lower extremities of said side walls and is secured to the right side wall, as seen in Fig. 4, by a clamping screw 86 and is positioned relatively to the left side wall by a screw 88 which is adjustable to determine the spacing of the side walls from each other and is secured in adjusted position by a lock nut 90. It will be seen that the illustrated organization provides a universal bearing for the lower portion of the column on which the column itself is mounted for turning movement on an axis extending transversely of the gun mount, said axis being identified by the trunnion pins 82. It will be understood that the turning movement of the lower portion of the column about this axis results from the slight bending movement imparted to the column by the severe thrust of the simultaneous recoil of the four guns. The lower portion of the column is also free to turn about a second axis identified by the common center 78 (Fig. 4) of the curvature of the side walls of the hub 66. During the movement of the guns in azimuth the column 26 turns about a third axis identified with the ball bearing 62. The universal mounting thus provided permits the lower portion of the column to turn freely on the ball bearing 62 whether or not the axis of that bearing is accurately alined with the axis of the bearing 56 (Fig. 2) at the upper end of the column. The gear segment 68 (Fig. 6) meshes with a similar gear segment 92 actuated by hydraulic means including a piston 93 (Fig. 2) to turn the gun assembly in azimuth. The gear segment 92 is mounted to turn on a ball bearing 94 (Fig. 5) clamped to a cylindrical structure 96 in an extension 98 of the crosshead 22 and is clamped to the upper end of said cylindrical structure by a bolt 100. The outer race of the ball bearing is mounted in a counter bore in the hub 101 of the gear segment 92 and is held therein by an annular retaining plate 103 secured to the bottom of the hub 101 by screws 105. Inasmuch as the two segments 68 and 92 are supported on a single crosshead any slight movement of the crosshead by the thrust of the recoil of the guns will cause no relative movement of the gear segments. Furthermore, any turning movement of the lower portion of the column as the column bends under the thrust of the recoil of the guns will cause no relative movement of the gear segments since the provision of the trunnion mounting of the lower portion of the column in the shoes 80 provides for such turning movement of the lower portion of the column.

The illustrated guns are so mounted on their adapters that they may be individually adjusted for bore sighting to determine either the degree of dispersion of fire of the guns or alternatively the point at which their fire crosses. In the illustrated assembly the forward portions of the recoil cartridges are universally mounted to permit adjustment of each gun both heightwise and widthwise for purposes of bore sighting. Referring to Fig. 1 the two upper guns 102 are slidably mounted in recoil cartridges 104, and each of said recoil cartridges is pivotally mounted in a yoke 106 for swinging movement about an axis extending widthwise of the gun and the yoke 106 is provided with a stem which is pivotally mounted in the adapter 28 for turning movement on an axis extending heightwise of the gun. The two lower guns 108 are mounted in recoil cartridges 110 and each recoil cartridge is pivotally mounted in a yoke 112 for swinging movement about an axis extending heightwise of the gun, the yoke being provided with a stem which is pivotally mounted in the adapter for swinging movement on an axis extending widthwise of the gun. This arrangement of the lower yokes 112 permits the use of relatively small adapters thus substantially minimizing the weight of the mount.

Figure 8:
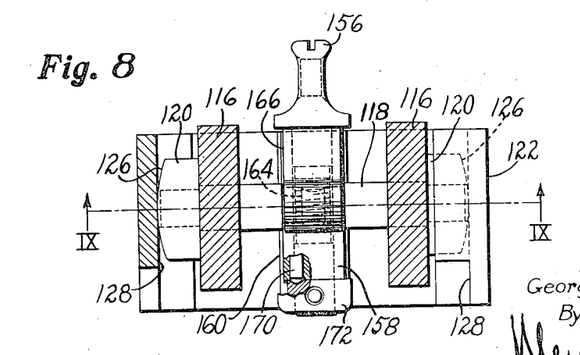
Fig. 8 is a section on the line VIII—VIII of Fig. 7.
Figure 9:
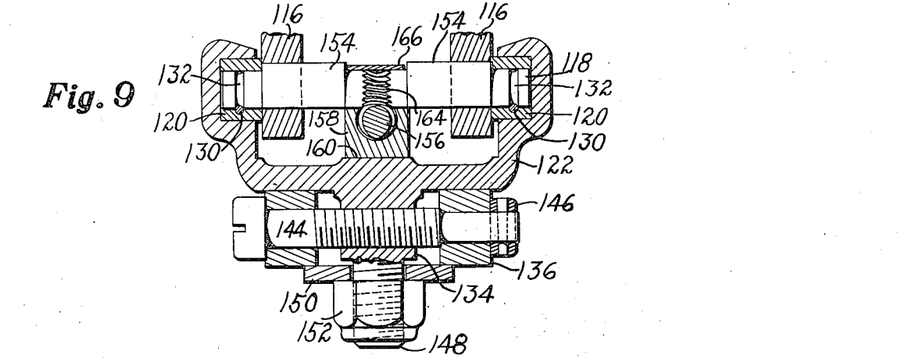
Fig. 9 is a section on the line IX—IX of Fig. 8.
Figure 10:
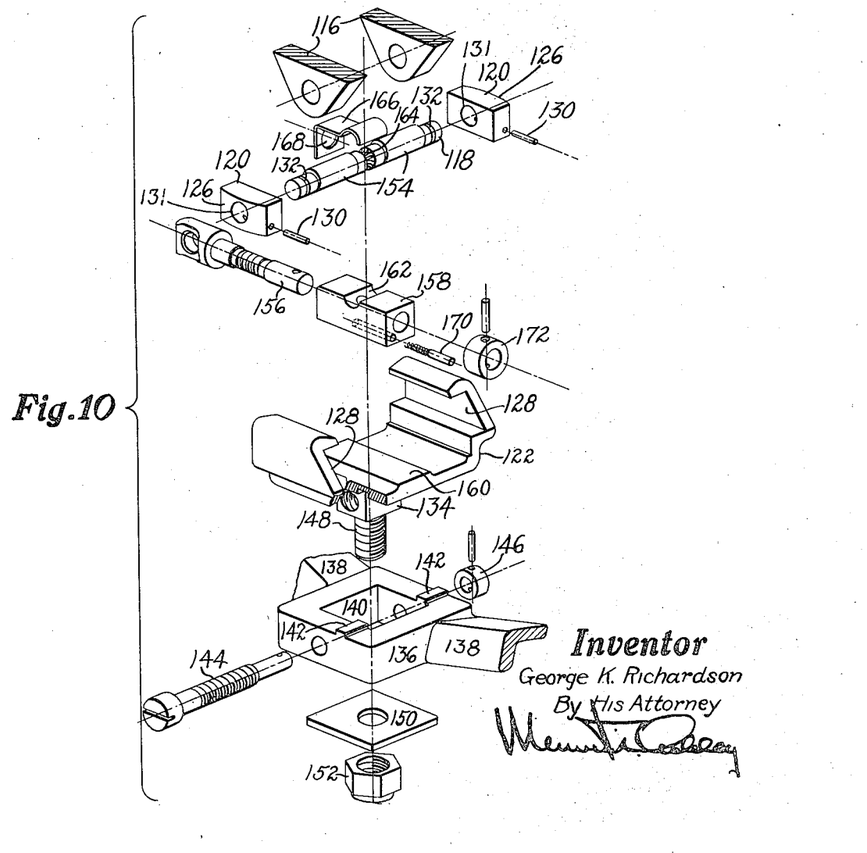
Fig. 10 is an exploded view illustrating the mechanism shown in Fig. 9.

The mechanism for individually adjusting the guns for purposes of bore sighting is illustrated in Figs. 7 to 10. Referring to Fig. 7 the breech portion of each gun is securely held in a channel member 114 having downwardly extending lugs 116. Pivotally mounted in the lugs 116 is a cross shaft 118 which has pivotally mounted on its opposite end portions two shoes 120. To provide for movement of the gun in recoil and also for removal of the gun from its mounting for purposes of repair the shoes 120 are slidably mounted in grooves or ways in a yoke 122 supported on an extension 124 of the adapter 28. Referring to Fig. 8, each shoe 120 has an arcuate side face 126 engaging the base of the groove 128 in the yoke and serving to obviate binding of the shoes in the grooves and to facilitate removal and replacement of the gun. The shoes 120 are each retained in a fixed position endwise of the cross shaft 118 while permitted to turn thereon by a cylindrical key 130 (Fig. 10) mounted in a bore extending longitudinally of the shoe and intersecting an edge portion of the bore 131 provided in the shoe for the cross shaft. The pin 130 is thus arranged to be seated in a circular groove 132 extending about the cross shaft.

For reasons which will appear hereinafter the extension 124 of the adapter 28 is so constructed as to provide a hollow square structure 136 (Fig. 10) connected to the body of the adapter by angle arms 138. The yoke 122 has a square stem 134 constructed and arranged to extend downwardly through the hollow square 136 and to bear against its inner wall 140, and for further aiding in positioning the yoke on the hollow square and guiding its gun adjusting movement the hollow square has upwardly projecting tongues 142 which fit into a complemental groove in the base of the yoke. To permit widthwise adjustment of the breech portion of the gun the stem 134 is substantially narrower than the opening in the hollow square. For effecting such widthwise adjustment of the yoke 122 an adjusting screw 144 is arranged to extend through opposite walls of the hollow square and its central threaded portion operates in a threaded hole in the stem 134. The screw 144 is held against endwise movement relatively to the hollow square by a collar 146 pinned to the reduced end portion of the screw. In order to secure the yoke 122 in adjusted position the stem 134 has a threaded cylindrical end portion 148 extending freely through an opening in a plate 150 which provides a bearing surface for a clamping nut 152 on said end portion 148. It will be seen that by turning the screw 144 the yoke 122 is moved widthwise to effect widthwise adjustment of the gun.

In order to provide for adjustment of the breech portion of the gun heightwise thereof for bore sighting, the portions 154 (Figs. 9 and 10) of the cross shaft 118 extending through the lugs 116 are eccentric relatively to the end and center portions of the cross shaft and thus by turning the cross shaft the desired heightwise adjustment may be effected. For turning the cross shaft a headed pin 156 is mounted for turning movement in a block 158 slidably mounted on a flat face 160 of the yoke 122 and the central portion of the top of said block is provided with a transverse groove 162 exposing the central portion of the pin 156. The groove 162 is complemental in shape to the central portion of the cross shaft 118 and is so arranged heightwise of the block as to engage the cross shaft and to hold the threaded central portion of the pin 156 in working engagement with worm gear teeth 164 on the cross shaft. The block 158 is positioned lengthwise of the cross shaft 118 by an angle plate 166 (Fig. 10) mounted on the block and having a cylindrical end portion which embraces the central portion of the cross shaft 118. The angle plate 166 is held in position on the block 158 by the pin 156 which passes through a hole 168 in the angle plate and confines the angle plate between the head of the pin and the end face of the block. It will be seen that by turning the pin 156 the cross shaft 118 may be rotated to effect heightwise adjustment of the breech portion of the gun. For locking the pin 156 in adjusted position the block 158 carries in an offset bore a spring pressed latch pin 170 which seats in any one of a series of recesses provided in a collar 172 pinned on the pin 156.

Figure 3:
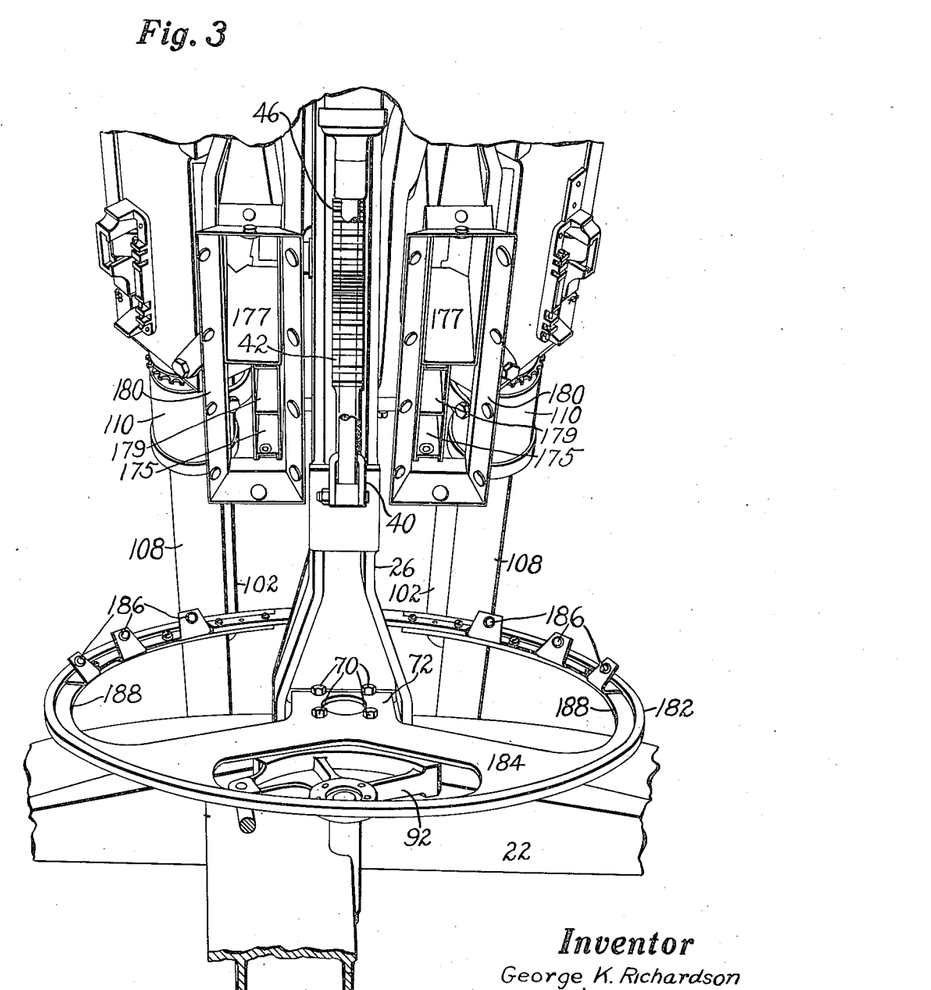
Fig. 3 is a perspective view of the gun mount taken from the gunner's position, the flexible conductors being omitted, and the guns being shown in a downturned position but centrally located as to their position in azimuth.

For eliminating spent ammunition elements, which ordinarily comprise empty cartridge cases and metallic links which connected the cartridges together, each of the upper guns 102 is provided with a rigid chute 174 (Fig. 2) which receives the empty cartridge cases and a smaller rigid chute 175 which receives the metallic links, and each of the lower guns 108 is provided with a short rigid chute 177 for the empty cartridge cases and a rigid chute 179 for the metallic links. Each chute 174 is secured to one of the upper guns by a yoke 202 and a bracket 204, and similarly each chute 177 is secured to one of the lower guns by a yoke 206 and a bracket 208. The lower end of each chute 174 is positioned just above the mouth of the lower chute 177, and the mouth of each lower chute is extended inwardly toward the column 26 to receive the empty cartridge cases which pass through the upper chute. The chutes 175, 177 and 179 at each side of the gun mount terminate in a common outlet 180 (Fig. 3) having outwardly flaring margins provided with fastenings for attaching the open upper end portion of a flexible conductor 176. As shown in Fig. 1, there are two such flexible conductors one at each side of the gun mount. Spent ammunition elements pass through the flexible conductors and into a fixed funnel 178 (Fig. 1) which directs said elements downwardly through an opening in the bottom of the fuselage. As illustrated in Fig. 1, each flexible conductor is a generally cylindrical fabric member arranged in upright position and supported solely by its connection to the outlet 180 of the rigid chutes. The flexible conductors are constructed to expand and contract during movement of the guns in elevation and have inserted therein a spiral wire, or alternatively, a series of generally parallel metallic hoops, to prevent the conductors from collapsing and thus impeding the discharge of the spent ammunition elements. Inasmuch as the flexible conductors are required to move with the gun assembly in azimuth their lower or outlet portions are secured to a plate or ring 182 (Fig. 3) having a web portion 184 which extends into the center of the ring and terminates in the plate 72 hereinbefore referred to, said plate being secured to the hub of the gear segment 68 (Fig. 4) by the clamping screw 70. For fastening the flexible conductors to the ring 182 the ring is provided with upstanding, outturned tabs some of which are shown at 186 in Fig. 3, each tab being provided with a headed stud for fastening a predetermined portion of the flexible conductor to the tab. The outlet portion of each flexible conductor registers with an opening 188 in the ring 182 and spent ammunition elements passing through said openings in the ring are received by the funnel 178. Referring to Fig. 1 it will be seen that the funnel, which is shown in section in said figure, is shaped to fit into the irregular space available for it beneath the ring 182. Said funnel has a cylindrical central section 190 which extends about the lower bearing of the column 26. In order to insure the discharge of the spent ammunition elements into the funnel when the gun assembly is in an extreme position in azimuth the funnel is provided with generally parallel portions extending forwardly of the airplane and overlying the crosshead 22. These forward extensions have bottom surfaces 194 sloping downwardly toward the outlet portion of the funnel and side walls 196 which diverge rearwardly and terminate respectively in the cylindrical portion 190 and the upper margin of the body portion of the funnel. As shown in Fig. 2, the funnel 178 is secured by brackets 198 to the bottom of the fuselage adjacent to the opening 200 provided in the fuselage for the outlet of the spent ammunition elements.

For aiming and firing the guns any suitable means may be provided. It is probably feasible to move the gun assembly manually in aiming the guns but because of the weight and consequent inertia of the assembly I prefer to employ power actuated means. To this end the hydraulically actuated piston 38 hereinbefore referred to is provided for moving the gun assembly in elevation and the hydraulically actuated piston 93 is provided for moving the guns in azimuth. Any suitable means may be provided for controlling the actuation of the pistons. Preferably, said control mechanism is conveniently located with relation to a target sighting means and also with relation to manually operated means for closing an electric circuit to effect simultaneous firing of the guns.

Ammunition for the respective guns is automatically conveyed from a source of supply preferably located amidships. In accordance with the usual practice the ammunition is provided in the form of belts. While any known form of ammunition belt may be provided, the illustrated gun mount is adapted to employ belts of the well-known disintegrating metallic link construction. While any known type of ammunition belt conveying means or chutes may be employed for conveying the belt from the usual ammunition trough to the guns, I prefer to provide for this purpose mechanism of the type illustrated in an application for United States Letters Patent Serial No. 543,344, filed July 3, 1944, in the name of Wilbur L. MacKenzie. The MacKenzie application discloses an ammunition feeding mechanism constructed and arranged for use with the four-gun mount herein illustrated. Said mechanism comprises four flexible chutes, one for each gun, and means for moving the receiving end of each chute relatively to the gun mount in synchronous relation to its target tracking movements thereby maintaining a substantially constant slack in each flexible chute and obviating the occurrence of sharp curvatures and abrupt convolutions which would be inevitable if the receiving ends of the flexible chutes were fixed while the delivering ends moved with the guns during their target tracking movements.

While any suitable hydraulic means may be provided for actuating the cylinders 38 and 93 I prefer to provide for this purpose mechanism including means for causing the guns to continue to track the target until the gunner, by manual operation of the hydraulic controls, arrests the automatic target tracking movement. A hydraulic mechanism embodying means for effecting automatic target tracking movement of a gun mount is disclosed in United States Letters Patent No. 2,425,433, granted August 12, 1947, in the name of Lambert S. Linderoth, Jr.

Having thus described my invention, what I claim as new and desire to secure by Letters Patent of the United States is:

In a gun mount, four guns, a cradle, a column on which the cradle is pivotally mounted for swinging movement in elevation, said guns being supported by the cradle, two above and two below the pivotal axis of the cradle on the column, means mounting each of the upper guns on the cradle comprising a yoke pivotally mounted on the cradle, and a recoil cartridge pivotally mounted in the yoke to swing on an axis extending widthwise of the gun, and means mounting each of the two lower guns on the cradle comprising a yoke pivotally mounted on the cradle, and a recoil cartridge pivotally mounted in said yoke for swinging movement about an axis extending heightwise of the gun.

GEORGE K. RICHARDSON.

REFERENCES CITED

The following references are of record in the file of this patent:

UNITED STATES PATENTS

| Number | Name | Date |
|---|---|---|
| 1,387,678 | Anderson | Aug. 16, 1921 |
| 1,602,298 | Bethel | Oct. 5, 1926 |
| 1,909,435 | Uggla | May 16, 1933 |
| 1,916,391 | Shamberger | July 4, 1933 |
| 2,255,172 | Johnson | Sept. 9, 1941 |
| 2,303,327 | Coupland | Dec. 1, 1942 |
| 2,323,430 | Trotter | July 6, 1943 |
| 2,331,982 | Johnson | Oct. 19, 1943 |
| 2,335,286 | Klemperer et al. | Nov. 30, 1943 |
| 2,335,835 | Zietlow | Nov. 30, 1943 |
| 2,350,662 | Adams et al. | June 6, 1944 |
| 2,379,185 | Reek | June 26, 1945 |
| 2,394,462 | Maurer et al. | Feb. 5, 1946 |
| 2,412,109 | Trotter | Dec. 3, 1946 |
| 2,430,747 | Trotter | Nov. 11, 1947 |

FOREIGN PATENTS

| Number | Country | Date |
|---|---|---|
| 789,778 | France | Aug. 26, 1935 |
| 483,847 | Great Britain | Feb. 15, 1937 |
| 214,926 | Switzerland | Aug. 16, 1941 |
| 555,262 | Great Britain | Aug. 13, 1943 |
| 560,269 | Great Britain | Mar. 28, 1944 |

OTHER REFERENCES

Designing Gun Turrets, "Aviation," pp. 227–229, June 1943.

5-Gun Turret, "Aviation," pp. 44, 45, 146, 148, May 1941.